United States Patent Office 3,837,982
Patented Sept. 24, 1974

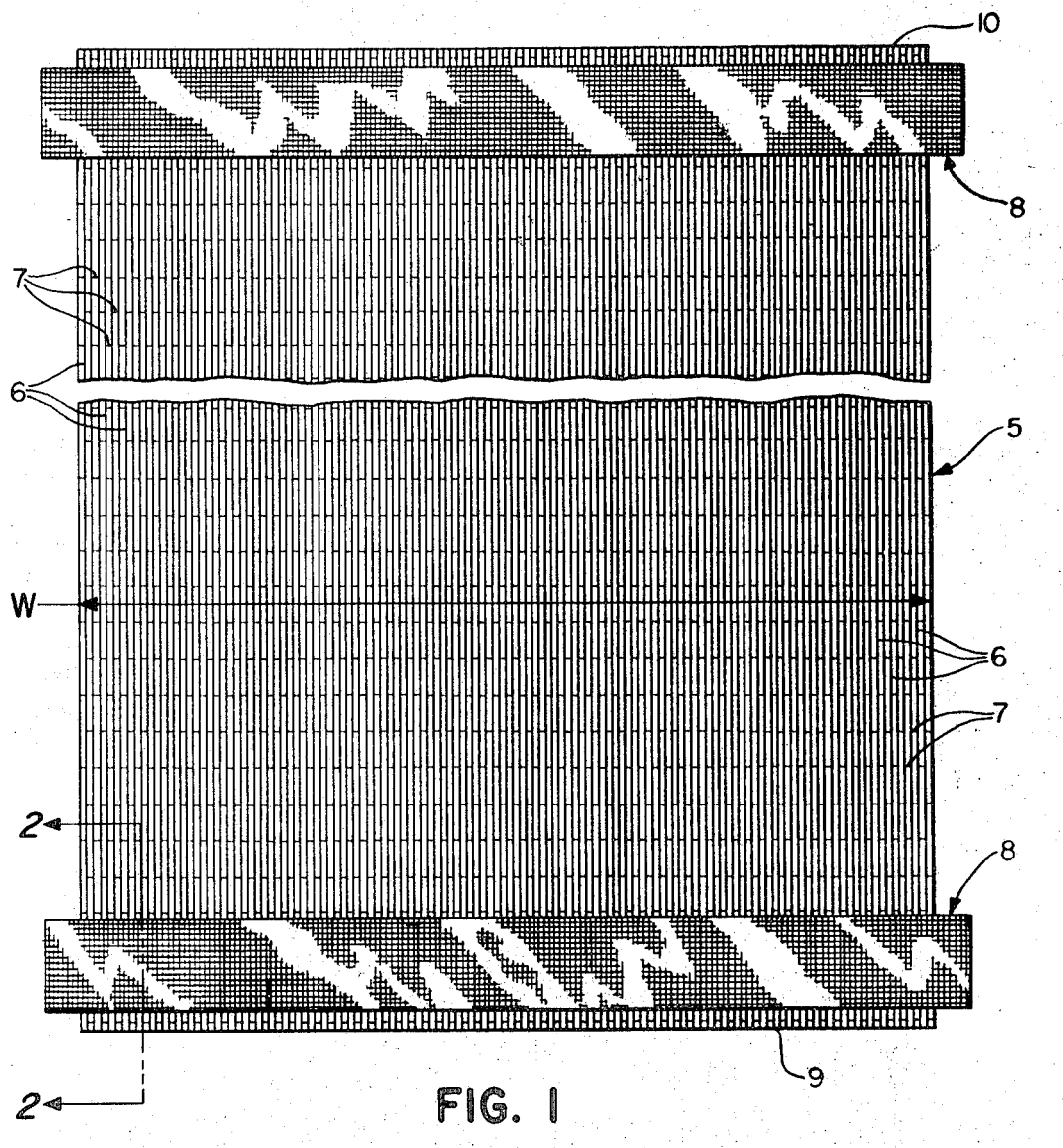
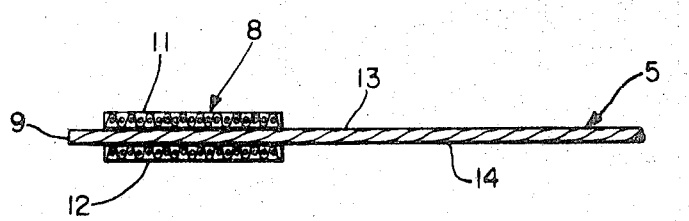
FIG. 1
FIG. 2

3,837,982
WIRE WOVEN FABRIC FOR PNEUMATIC TIRES
Samuel J. Di Paola, Burton, Ohio, assignor to The Goodyear Tire & Rubber Company, Akron, Ohio
Original application Sept. 3, 1970, Ser. No. 69,195, now abandoned. Divided and this application May 22, 1972, Ser. No. 255,351
Int. Cl. B32b 7/00
U.S. Cl. 161—39                    17 Claims

ABSTRACT OF THE DISCLOSURE

A fabric for reinforcing pneumatic tires conventionally woven from metal warp cords composed of individual wires or filaments having a diameter greater than .003 inches, and weft cords composed of non-metallic material. A tabby, preferably composed of square woven textile cord fabric, is cemented along the leading and trailing edges of the wire cord fabric for maintaining the width of the wire cord fabric uniform throughout its length.

BACKGROUND OF THE INVENTION

This application is a division of copending application Ser. No. 69,195, filed Sept. 3, 1970 and now abandoned.

Cords composed of metal, such as bronze or brass-coated steel wire, are in greater demand for reinforcing pneumatic tires. The metal cords must be coated with rubberized material and formed into sheets for easy handling and building of the tire on conventional tire building drums. This is generally accomplished by taking the required number of cords from a standard creel with spools of wire, and moving the cords in predetermined parallel relation while compressing rubberized material around and between the adjacent cords forming a continuous sheet of rubberized material with reinforcing cords.

This particular method of forming tire cord fabric is fine, because no pick threads are utilized. However, many types of tires are built, requiring wire fabric having different end counts, i.e. wire cords per inch of width of the fabric. This means there must be a machine for making every fabric with a different end count, or a machine must be continually shut down and reorganized to produce the desired fabric. In such cases, the number of spools of wire in the creel must be changed, after which the added or subtracted wire cords must be threaded or removed from the machine, and the spacings between the wires adjusted to obtain the required end count of wire cords. This operation is costly and time consuming.

The invention is directed to forming a wire woven fabric similar to the fabrics woven from textile cords. Thus, more conventional calendering methods can then be used to coat differently woven fabrics with rubberized material used in the production of pneumatic tires.

Briefly stated, the invention is in a wire woven fabric and method for forming the fabric. The fabric is woven from metal warp cords composed of individual wires or filaments having a diameter greater than .003 inches. Weft cords composed of textile material are disposed in interwoven relation with the metal warp cords. In another aspect of the invention, a tabby, as hereinafter defined, is secured to the wire woven fabric adjacent its leading and trailing edges, i.e. the edges being the first and last to pass between conventional calendering rollers for coating the wire woven fabric with rubberized material used in the production of tires.

DESCRIPTION OF THE DRAWING

The following description of the invention will be better understood by having reference to the annexed drawing, wherein:

FIG. 1 is a plan view of a section of woven fabric made in accordance with the invention; and FIG. 2 is a section viewed from the line 2—2 of FIG. 1.

DESCRIPTION OF THE INVENTION

Referring more particularly to the drawing, there is shown a fabric, generally indicated at 5, used in the production of pneumatic tires. The fabric 5 comprises a number of similar warp cords 6 composed of any suitable metal, e.g. high carbon steel wire coated with either zinc or brass and having an elongation at break of about 2 percent. The metal warp cords 6 are each composed of individual wires or filaments having a diameter greater than .003 inches. Moreover, the diameter of the individual wire filaments is preferably not greater than about .015 inches, and is in the narrower preferred range of from about .005 inches to about .012 inches. The overall gauge or diameter of each of the metal warp cords 6 is preferably in the range of from about .01 inches to about .05 inches. For example, a conventionally designated 7 x 3 cord composed of individual wire filaments having a diameter of about .0059 inches, has an overall gauge of about .036 inches.

A number of similar weft or pick threads 7 are conventionally interwoven with the metal warp cords 6 to maintain the cords in parallel relation, until they pass through a standard calendering machine, where the fabric 5 is coated with elastomeric material, e.g. any natural or synthetic rubber. The weft threads 7 are composed of any suitable fibrous material having a breaking strength of from about 1½ to about 4 pounds, and an elongation at break of from about 20 to about 45 percent. The size of the non-metallic weft thread depends on the corresponding size of the metal warp cord.

A polyester monofilament having a denier in the range of from about 200 to about 300, or a nylon multifilament having a denier in the range of from about 200 to about 400, is preferably used as a weft thread or cord 7. The nylon weft threads 7, when used, were given a twist in either an S or Z direction of from about 1½ to 2 turns per inch of thread length. Moreover, it was found beneficial to use three pick threads per inch length of fabric. Polyester monofilament weft threads were selected for use with metal warp cords 6 having a gauge less than about .03 inches, since the monofilament weft threads tend to crimp, causing the metal warp cords 6 to settle in the troughs formed by the crimping, thereby maintaining the warp cords 6 in better spaced relation. The smaller sized metal warp cords 6 mentioned above, tend to slide over the nylon multifilaments causing bunching of the cords, which is detrimental to calendering and coating the fabric with rubber.

The fabric 5 is woven in a conventional loom used to weave tire cord fabric from textile warp cords and weft threads. The metal warp cords 6, as they leave the creel, are preferably tensioned at about 1 to 2 pounds to eliminate slack in the cords during weaving.

A tabby 8 is disposed adjacent the leading and trailing edges 9 and 10 of the finished woven fabric 5. The leading and trailing edges 9 and 10 of the fabric 5, are the longitudinal endings of each roll of woven fabric 5, which are the first and last to pass through opposing calendering rollers used to compress rubberized material to the woven fabric 5, thereby forming a sheet of rubberized material which is generally stored for later use in building an uncured tire carcass suitable for placing in a mold and vulcanizing. The tabby 8 is composed of any suitable stiffening material, e.g. fused plastic or textile cord fabric, which is secured to the fabric 5 adjacent its leading and trailing edges 9 and 10, and acts to maintain the width of the fabric at these points in uniform corresponding relation with the width of the fabric intermediate the leading and trailing edges 9 and 10. Normally, a greater number of weft threads are interwoven with the warp cords to reinforce and stabilize the leading and trailing edges of tire cord fabric woven from textile material. This arrangement was found unsuitable for fabric with metal warp cords, however, since the increased number of weft threads drew or pulled in the lateral edges of the fabric, thereby distorting the fabric adjacent its leading and trailing edges and making the ends unsuitable for use in building tires.

The tabby 8 preferably comprises two strips 11 and 12 of woven fabric which are cemented in opposing relation on either side 13 and 14 of the wire woven fabric 5. The tabby 8 extends laterally across the woven fabric 5 and is coextensive with the width W of the wire woven fabric 5. The tabby strips 11 and 12 selected for this purpose, were square woven from warp cords and weft threads composed of any suitable textile material, e.g. cotton or rayon. The warp cords of the strips 11 and 12 are disposed at right angles to the warp cords 6 of the fabric 5. Any suitable epoxy or other adhesive can be used to cement the strips 11 and 12 of square woven material adjacent the leading and trailing edges 9 and 10 of the wire woven fabric 5. A single wider strip can be used in place of two narrower strips. For example, a single strip having a width of about 6 inches can be cemented to one of the sides 13 or 14 of the wire woven fabric 5 in place of two 3-inch strips cemented on opposing sides 13 and 14 of the wire woven fabric 5. The cement is dried by any suitable means, e.g. infra-red radiation from infra-red lamps suitable for curing the cement in a short period of time, e.g. four minutes. Care should be taken not to overcure the tabby 8, since it will become brittle and break. The tabby 8 maintains the wire woven fabric 5 at a fixed width W throughout its entire length. Otherwise, the longitudinal ends 9 and 10 would reduce in width, such that valuable wire woven fabric 5 would be lost and unsuitable for calendering and building tire carcasses.

The tabbies 8 are positioned on the wire woven fabric 5 during the weaving process. For example, when a sufficient amount of fabric is woven for placing in a roll, the loom is stopped. A pair of tabbies are cemented in spaced lateral relation across the fabric 5. The fabric 5 is then cut between the tabbies. In this way, a tabby 8 is secured adjacent the leading and trailing edges 9 and 10 of the fabric 5.

The finished wire woven fabric 5, with the tabby 8 is passed through a conventional calendering machine used to coat the fabric with rubber. The rubber coated fabric is cut into pieces and cord-oriented, i.e. pieced together such that the warp cords are at a predetermined angle to the longitudinal axis of the sheet of rubberized metal fabric 5. The rubberized metal fabric, with properly oriented cords, is then used to build tire carcasses suitable for curing.

Thus, there has been provided a fabric woven from wire cords and textile material, after which tabbies are placed transversely across the fabric adjacent the leading and trailing edges of the fabric to maintain a uniform width throughout the woven fabric. The finished fabric can then be passed through a conventional calender for coating the fabric with rubber.

While certain representative embodiments and details have been shown for the purpose of illustrating the invention, it will be apparent to those skilled in the art that various changes and modifications may be made therein without departing from the spirit or scope of the invention.

What is claimed is:

1. A length of tire cord fabric having opposing longitudinal sides and a leading and a trailing edge, comprising:
   (a) a plurality of metal warp cords extending longitudinally of the fabric, each of the cords including a plurality of individual wires cabled together, each of the wires being composed of steel and having a diameter greater than .003 inches;
   (b) a plurality of weft threads disposed in plain interwoven relationship with the metal warp cords, each of the weft threads being composed of continuous fibers and having a denier of at least 200; and
   (c) a tabby disposed adjacent the leading and trailing edges of the fabric, each of the tabbies being at least one separate strip of stiffening material secured laterally across the fabric in angular relation to the longitudinal axis of the fabric for helping prevent distortion of the fabric at said edges, the stiffening material being composed of plain woven textile warp cords and weft threads, the textile warp cords being angularly disposed to the metal warp cords.

2. The fabric of Claim 1, wherein each of the tabbies includes textile warp cords which are normal to the metal warp cords and coextensive with the width of the fabric.

3. The fabric of Claim 2, which includes means for cementing the tabbies to the fabric.

4. The fabric of Claim 3, wherein the textile warp cords are composed of material selected from the group consisting of cotton and rayon.

5. The fabric of Claim 4, wherein each of the tabbies includes another strip of similar plain woven material secured along said edges in opposite relation to the other strip of plain woven material, said strips sandwiching the fabric with metal warp cords therebetween.

6. The fabric of Claim 1, wherein the weft threads of the fabric are each composed of continuous fibers and have a breaking strength of about 1½ to about 4 pounds and an elongation at break of from 20 to 25 percent.

7. The fabric of Claim 1, wherein the weft threads of the fabric are composed of material selected from the group consisting of nylon and polyester.

8. The fabric of Claim 1, wherein the individual wires have a diameter not greater than about .015 inches.

9. The fabric of Claim 1, wherein the individual wires have a diameter in the range of from about .005 to about .012 inches.

10. The fabric of Claim 1, wherein the overall gauge of each metal cord is in the range of from about .01 to about .05 inches.

11. The fabric of Claim 1, wherein the weft threads of the fabric are composed of polyester monofilaments.

12. The fabric of Claim 1, wherein the weft threads of the fabric are composed of nylon multifilaments.

13. The fabric of Claim 12, wherein the nylon weft threads have a predetermined twist in either direction for helping stabilize the fabric.

14. The fabric of Claim 13, wherein the nylon weft threads have a twist in either direction from about 1½ to about 2 turns per inch of thread length.

15. The fabric of Claim 1, wherein the tabby comprises a strip of plain woven material having textile warp cords which traverse the metal warp cords and weft threads which parallel the metal warp cords.

16. The fabric of Claim 15, wherein the warp cords of the tabby are composed of material consisting of cotton and rayon.

17. The fabric of Claim 16, wherein each tabby includes another strip of similar plain woven material secured to the other side of the fabric opposite the other strip, the strips sandwiching the tire cord fabric therebetween.

References Cited

UNITED STATES PATENTS

| | | | |
|---|---|---|---|
| 2,659,958 | 11/1953 | Johnson | 161—86 |
| 2,401,260 | 5/1946 | Lord et al. | 161—91 |
| 2,019,700 | 11/1935 | Gyatt | 161—78 |
| 265,302 | 10/1882 | Brigham | 161—86 |
| 3,087,699 | 4/1963 | Foster | 161—91 |
| 2,886,481 | 5/1959 | Swan | 156—88 |
| 2,549,581 | 4/1951 | Dodge | 161—91 |
| 2,202,013 | 5/1940 | Lougheed | 161—91 |
| 2,384,771 | 9/1945 | Ryan | 161—91 |

HAROLD ANSHER, Primary Examiner

J. J. BELL, Assistant Examiner

U.S. Cl. X.R.

152—358; 156—88; 161—86, 91, 149